(12) United States Patent
Gurreri

(10) Patent No.: US 6,960,025 B2
(45) Date of Patent: Nov. 1, 2005

(54) CONNECTOR AND RECEPTACLE CONTAINING A PHYSICAL SECURITY FEATURE

(75) Inventor: Michael Gurreri, York, PA (US)

(73) Assignee: Tyco Electronics Corporation, Middletown, PA (US)

(*) Notice: Subject to any disclaimer, the term of this patent is extended or adjusted under 35 U.S.C. 154(b) by 233 days.

(21) Appl. No.: 09/908,140

(22) Filed: Jul. 17, 2001

(65) Prior Publication Data
US 2002/0126960 A1 Sep. 12, 2002

Related U.S. Application Data

(60) Provisional application No. 60/218,705, filed on Jul. 17, 2000.

(51) Int. Cl.$^7$ ................................................ G02B 6/38
(52) U.S. Cl. ...................................... 385/58; 439/680
(58) Field of Search .............................. 385/56, 58, 76, 385/77, 78, 85, 60; 439/488, 677, 680

(56) References Cited

U.S. PATENT DOCUMENTS

| | | | |
|---|---|---|---|
| 4,076,361 A | 2/1978 | Campbell | 339/75 |
| 4,531,798 A * | 7/1985 | Baur et al. | 439/368 |
| 4,764,129 A * | 8/1988 | Jones et al. | 439/677 |
| 4,781,626 A | 11/1988 | Lazarchik | 439/680 |
| 4,875,753 A | 10/1989 | Kalomiris | 250/96.2 |
| 5,044,994 A | 9/1991 | Van Woensel | 439/681 |
| 5,167,542 A | 12/1992 | Haitmanek | 439/681 |
| 5,244,402 A | 9/1993 | Pasterchick, Jr. et al. | 439/217 |
| 5,274,729 A | 12/1993 | King et al. | 385/134 |
| 5,335,301 A | 8/1994 | Newmann et al. | 385/75 |
| 5,420,951 A | 5/1995 | Marazzi et al. | 385/75 |
| 5,423,692 A | 6/1995 | Francis | 439/335 |
| 5,521,997 A | 5/1996 | Rovenolt et al. | 385/77 |
| 5,726,424 A | 3/1998 | Koether | 219/414 |
| 5,729,644 A | 3/1998 | Shiflett et al. | 385/59 |
| 6,019,521 A | 2/2000 | Manning et al. | 385/77 |
| 6,130,977 A | 10/2000 | Rosson | 385/76 |
| 6,149,313 A * | 11/2000 | Giebel et al. | 385/59 |
| 6,179,477 B1 | 1/2001 | De Marchi | 385/56 |
| 6,200,040 B1 | 3/2001 | Edwards et al. | 385/78 |
| 6,224,268 B1 | 5/2001 | Manning et al. | 385/56 |
| 6,247,850 B1 | 6/2001 | Edwards et al. | 385/56 |
| 6,354,746 B1 * | 3/2002 | Lee | 385/77 |
| 6,357,930 B1 * | 3/2002 | Wiltjer | 385/60 |
| 6,383,032 B1 * | 5/2002 | Gerberding | 439/681 |
| 6,422,759 B1 | 7/2002 | Kevern | 385/60 |
| 6,435,730 B1 | 8/2002 | Kevern et al. | 385/78 |

OTHER PUBLICATIONS

Amp Incorporated, SDL Top–Entry and Side–Entry PC Board Receptacles, Application Specification 114–2081, Mar. 26, 1996, Rev D. pp. 1 to 11.

* cited by examiner

Primary Examiner—Thanh-Tam Le

(57) ABSTRACT

A connector system that provides discriminating mating between plugs and receptacles by using a system of geometrically matched connector components which allow certain pairs of connectors to mate but which prevent all other combinations of connectors to mate.

In a preferred embodiment, the connector system comprises (a) a plurality of receptacles, each receptacle having an inner surface with a first geometry; (b) a plurality of plugs, each plug having a second geometry; (c) wherein the second geometry of a plug cooperates with at least one first geometry of a receptacle to allow the plug and the at least one receptacle to mate, while the second geometry of the plug physically interfering with all other second geometries of all of the other receptacles of the plurality of receptacles to prevent mating therewith.

14 Claims, 5 Drawing Sheets

CONNECTOR AND RECEPTACLE CONTAINING A PHYSICAL SECURITY FEATURE

CROSS REFERENCE TO RELATED APPLICATIONS

This application claims priority to U.S. Provisional Application No. 60/218,705, filed Jul. 17, 2000.

FIELD OF THE INVENTION

The present invention relates to connectors for the use with fiber optics, and more specifically relates to a system of novel key-slot structures to provide several mutually exclusive connectors for discriminating between users.

BACKGROUND OF THE INVENTION

Fiber optic communication systems have become increasing more popular in recent years. Fiber optic technology provides several advantages over the conventional copper wire-based technology. For example, fiber optic communication systems provide substantially increased bandwidth and allow for large volumes of data to be transferred quickly over long distances. In addition, these communications systems are not susceptible to electromagnetic interference (EMI).

With the increase in use of fiber optic systems, connectors have become necessary for connecting separate fiber optic cables. Connecting independent fiber optic cables can be challenging due the nature of optical fiber. For example, it is important that the optical fibers being connected are aligned properly in the axial and transverse directions so that there is minimal loss of light, i.e., data, at the connection.

As the fiber optic field has grown, there has been much effort devoted to developing various connectors to meet the needs of fiber optic systems. Connectors such as the SC Type connector and ST type connector became widely used as the industry standard. These types of connectors attempt to provide accurate and precise connection between fiber optic cables.

While fiber optic systems first gained acceptance as the backbone of many network systems, copper wire technology was still the most prevalent manner of connecting various workstations to the network system. Recently, however, the use of fiber optic technology has been extended to the complete network system including workstations, often referred to as fiber-to-the-desk (FTTD) applications.

The growth of FTTD applications complicates the requirements of optical connectors. In particular, connectors are needed that are small enough to be used in an office environment and that can be easily installed in the field. A group of connectors were developed to meet this need and are known as Small Form Factor (SFF) connectors. SFF connectors are designed to be the fiber optic equivalent of the small connectors used in copper wire technology, such as, for example, RJ-45 connectors. These small, efficient, easy-to-use SFF connectors have become a new industry standard and are expected to contribute to the continued growth of FTTD applications. One SFF connector of particular interest herein is the MT-RJ connector. Details on the construction of this type of connector can be found in U.S. Pat. No. 6,224,268, issued to Manning.

The increased popularity of FTTD applications creates a new problem as many large networks implement SFF connectors such as the MT-RJ connector. That is, a need has developed to limit user access to the particular fiber optic networks for security or other reasons. While some access limitation can be obtained through the use of software (e.g., passwords), further limitations are desirable using some type of physical barrier to the networks.

Therefore, what is desired is a means to regulate access to a network using some kind of physical barrier to prevent unauthorized users from connecting to the network.

SUMMARY OF THE INVENTION

The present invention provides for a connector system that provides discriminating mating between plugs and receptacles by using a system of geometrically matched connector components which allow certain pairs of connectors to mate but which prevent all other combinations of connectors to mate.

In a preferred embodiment, the connector system comprises (a) a plurality of receptacles, each receptacle having an inner surface with a first geometry; (b) a plurality of plugs, each plug having a second geometry; (c) wherein the second geometry of a plug cooperates with at least one first geometry of a receptacle to allow the plug and the at least one receptacle to mate, while the second geometry of the plug physically interfering with all other second geometries of all of the other receptacles of the plurality of receptacles to prevent mating therewith.

Preferably, the receptacle is a jack having a tub and the first geometry comprises a key and a plurality of ribs extending inward, and the plug comprises a housing and a ferrule contained within the housing, wherein the second geometry comprises a slot in the housing for cooperating with the key and secondary slots for cooperating with the ribs, and wherein the slot and the secondary slots cooperate with the key and the ribs to effect pre-alignment of the ferrule before final mating of the ferrule.

DETAILED DESCRIPTION OF THE INVENTION

Figure 1:
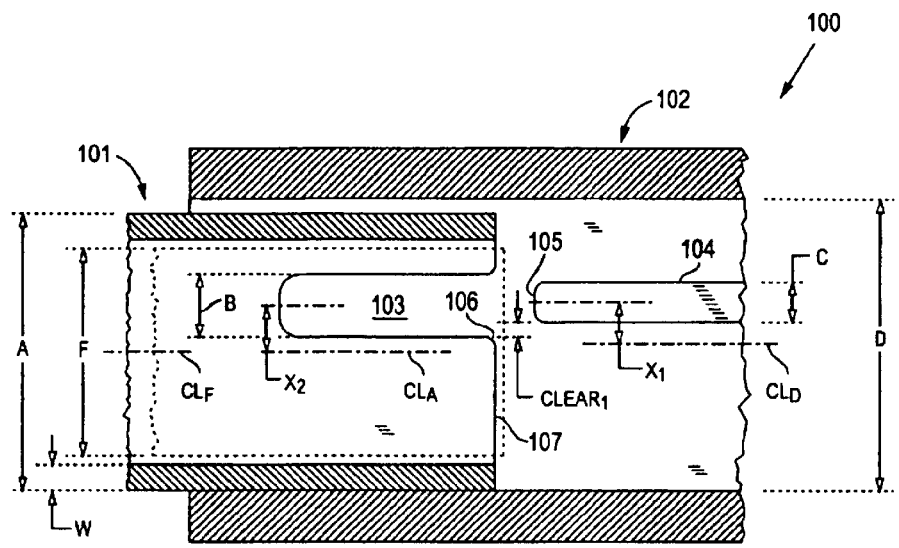
FIG. 1 depicts a top view of a plug as it is insert into the inside portion of the jack, which is known as the tub portion of the jack., for connector intended to mate.

The present invention relates to a connector system comprising a series of connector components which interconnect with each other in a discretionary way. Referring to FIG. 1, a preferred embodiment of a mating plug 101 and receptacle 100 of the connector system is illustrated. As shown, the plug 101 is partially inserted into the receptacle 100, which, in this embodiment, is a jack having a tub portion 102.

Although a jack is discussed herein in detail, it should be understood that the receptacle of the present invention is not restricted to a jack and may be any structure configured to receive a plug, including, for example, an adapter for connecting two plugs together or an integral connector on an active device (e.g., transceiver) or passive device (e.g., splitter).

The plug typically contains a conductive element such a fiber or wire which mates with a similar element in the receptacle. In fiber optic applications, it is common for the conductive element to be contained in a ferrule, which in turn is housed by the plug. In a preferred embodiment, the ferrule is an MT-type ferrule.

The outer surface of the plug 101 and the inner surface of the tub 102 have first and second geometries, respectively, which cooperate to allow only certain pairs of plugs and receptacles to mate (herein "mating pairs," "mating plug and jack," or "keyed pair"), and which physically interfere for all other combinations of plugs and jacks (herein "non-mating pairs," "non-mating plugs and jacks" or non-keyed pairs), thereby preventing non-mating plugs and jacks from effecting an optical or electrical coupling.

The first and second geometries may embody any known keying mechanism which discriminates between connector components. Such keying mechanisms include, for example, a key and slot relationship between the plug and jack, a receptacle dimensioned to receive only certain sized or shaped plugs, and even a magnetic signature for either attracting (for mating pairs) and repulsing (non-mating pairs). Preferably, the keying mechanism involves just a slight modification to the plug and jack such that essentially the same molds can be used to manufacture connectors of different keyed pairs. Although molding is preferred, it is should be understood that other techniques for producing the first and second geometries can be used including, for example, over molding and machining.

In a preferred embodiment, the invention uses a key and slot mechanism. Specifically, the slot can be embodied in the first or second geometry and the key can be embodied in the other geometry. In the particularly preferred embodiment shown in FIGS. 1–4, the key is part of the second geometry, while the slot is part of the first geometry; that is, the plug 101 has a slot 103 and the tub portion 102 of the jack has a key 104.

Figure 4:
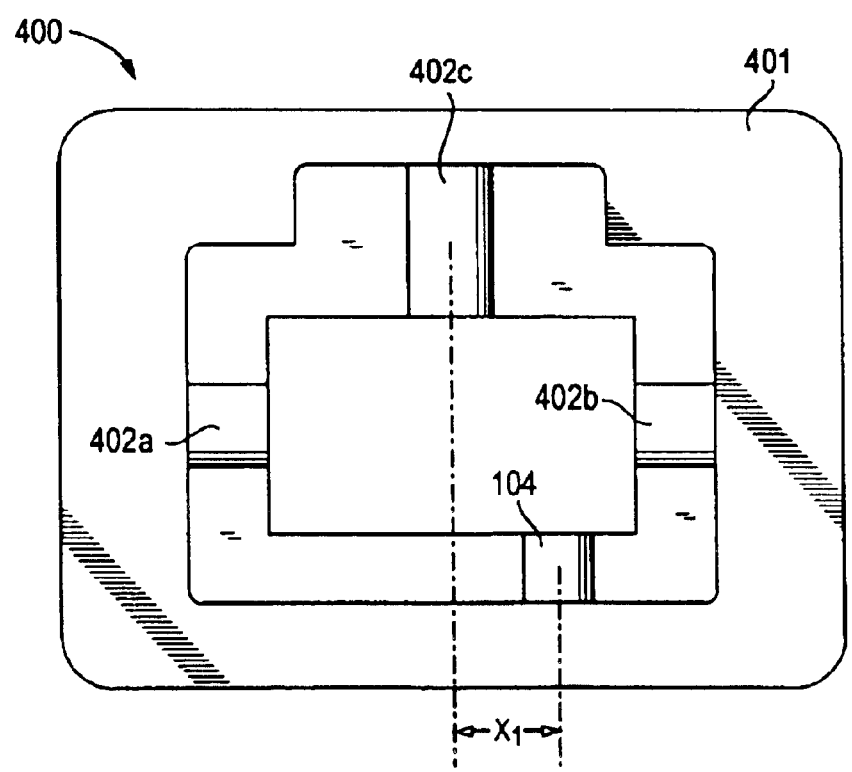
FIG. 4 depicts an end view of the tub component, showing the key which is used to allow or prevent mating with a particular plug.

This configuration is preferred since the key may cooperate with other "ribs" on the connector for pre-alignment purposes. More specifically, with particular reference to FIG. 3, an end view of housing 301 of the plug 101 is shown. The housing comprises four walls each wall having a slot 103, 302a, 302b, and 302c, respectively. FIG. 4 depicts an end view of housing 401 of the tub 400 in which the key 104 and ribs 402a, 402b, and 402c are disposed on the walls of the housing. The key 104 and the ribs 402a, 402b, and 402c cooperate with the slots 103, 302, 302a, 302b, and 302c, respectively, to effect pre-alignment of ferrule located within the plug with the jack before final mating of the connector plug with the connector jack. The final mating may be between the conductive elements of the connector system, such as, for example, between a couple of MT-type ferrules, which employ precise alignment pins/receiving holes on the ferrule face. Such ferrules are well known in the art. By pre-aligning the MT ferrules through the synergistic use of the key and slot, the inter-engagement of the closely-toleranced alignment pins/receiving holes is facilitated. The above-described synergistic keying and aligning feature of the present invention is realized with the MT-RJ connector (Tyco Electronics, Harrisburg, Pa.).

Figure 2:
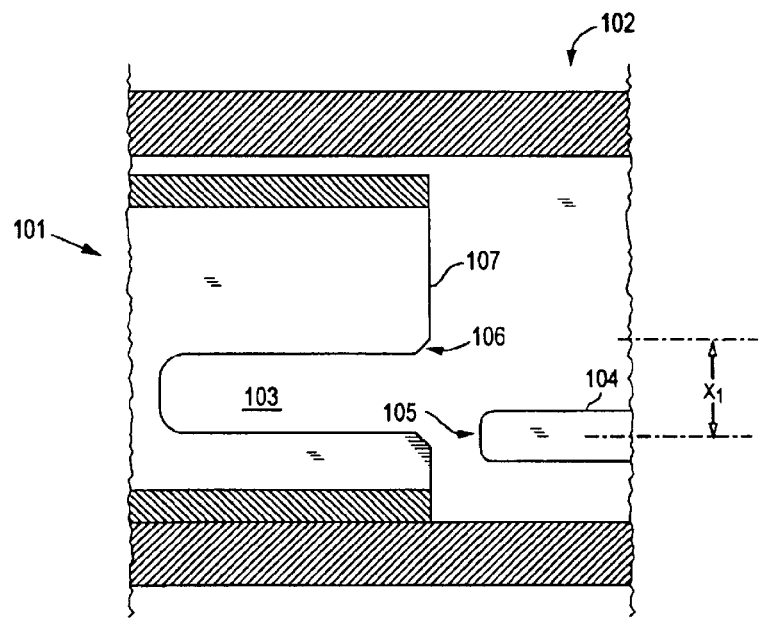
FIG. 2 depicts an expanded top view of the end of the key shown prior to an attempt to mate the connector plug with the tub of a connector jack for a connector not intended to mate.
Figure 3:
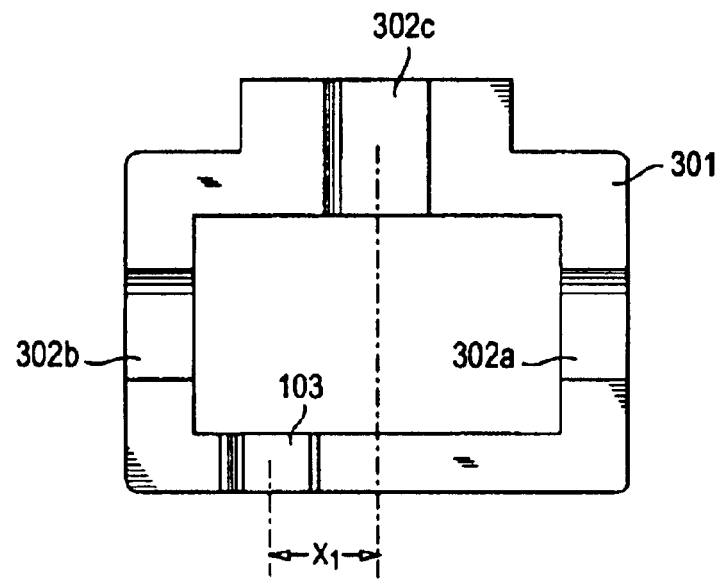
FIG. 3 depicts an end view of the plug component, showing a slot which is used to allow or prevent mating with a particular tub.

In a preferred embodiment, the mating end of the key 104 contains a flat portion shown as 105 and the mating end of the plug 101 has a chamfers 106 on the corners of the edges of the slot 103, while the remainder of the mating end of the plug comprises a flat portion 107. The radius corners on the key 106 and the chamfers on the plug 107 work as a guiding device and provide for the necessary alignment between the key and the slot when the plug is inserted into the tub of the jack. On the other hand, as shown in FIG. 2, when a user attempts to mate two non-mating plug and jack components, the flat portion of the key 105 contacts the flat portion of the plug 107 and provides for definite physical interference between the plug and jack when slot and key do not correspond. Accordingly, the use of this geometry prevents a user from forcing two non-mating plugs and jacks together. Therefore, the physical interference provided between the flat portion 105 of the tub and the flat portion 107 of the key assures that only desired combinations of plugs and jacks will mate.

Figure 5:
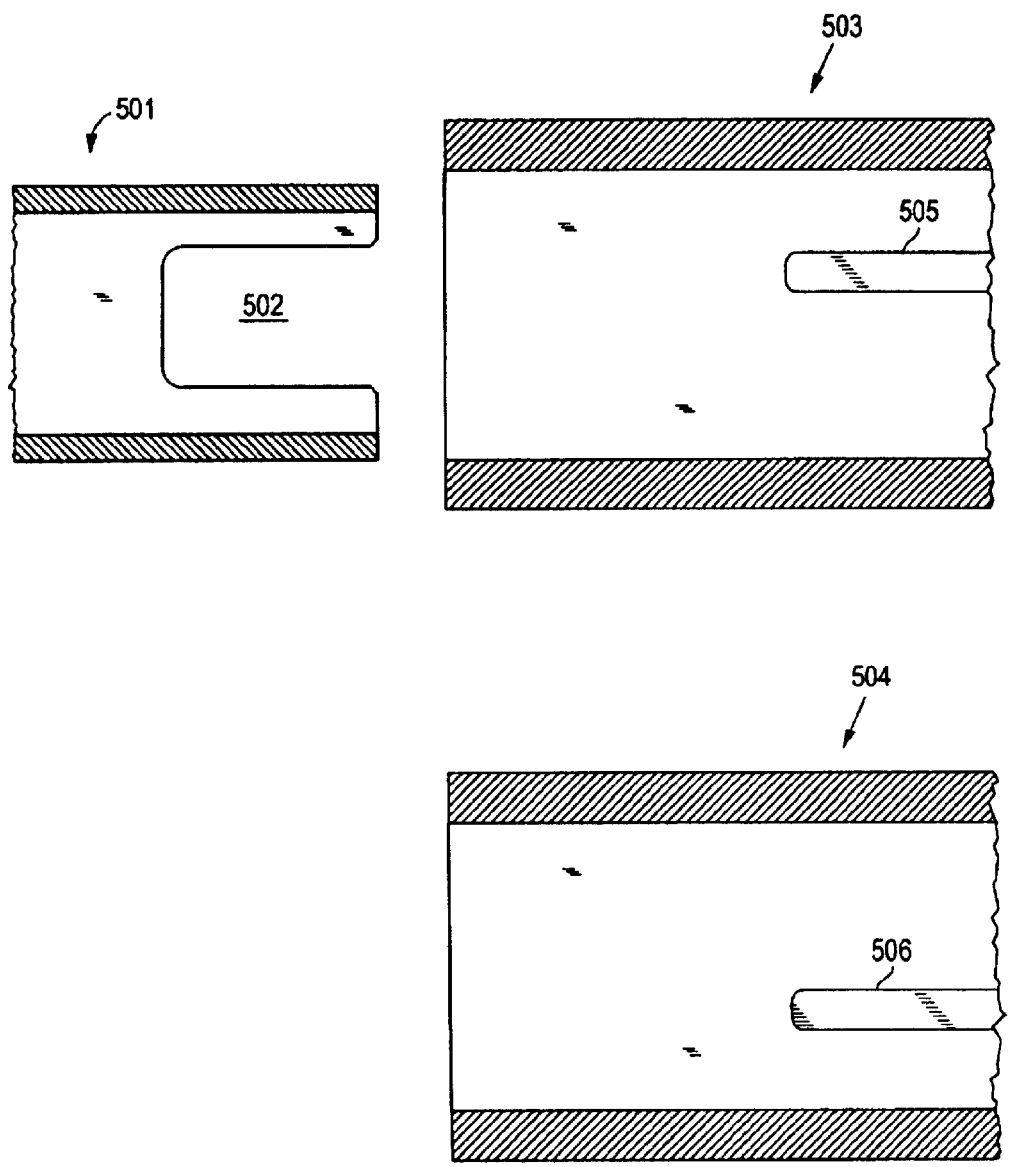
FIG. 5 depicts a plug with a slot configuration capable of mating with a plurality of jacks (i.e., a master plug).

The position of the key 104 on the tub 102 and the slot 103 on the plug 101 can be varied in such a manner so that a plurality of mutually-exclusive slot and key positions are formed. In one embodiment, the series of key and slot locations are mutually exclusive so that there is a one-to-one correspondence between jacks and plugs. In another embodiment, certain plugs may be configured to mate with a variety of different jacks. For example, it may be worthwhile to give network administers or people with high security clearance certain "master" plugs which are capable of mating with a number of jacks having different slot positions. Referring to the figures, FIG. 5 shows an embodiment of a master plug 501 which has a slot 502 that is configured (which, in this embodiment, means it is wide enough) to mate with jacks 503 and 504 which have different key positions 505 and 506, respectively. Although a wide slot is used in this embodiment to effect mating with two or more jacks having different key configurations, it should be understood that other embodiments are possible, such as, for example a plug with two or more slots.

The number of possible mutually exclusive mating pairs for a given plug and receptacle is a function of the physical parameters of the plug and the receptacle. More specifically, with reference to FIGS. 1–4, mutual exclusivity is ensured by adhering to the following relationships:

$$X_1 - C/2(D-A) + \Delta \leq F/2 \qquad (1)$$

$$X_2 + B/2 < A/2 - W \qquad (2)$$

$$X_{1a} + \text{Clear}_1 + Z = X_{1b} \qquad (3)$$

wherein:
A=the width of the plug 101;
B=the width of the slot 103 onthe plug 101;
C=the width of the key 104;
D=the distance across the opening of the tub;
F=the width of the ferrule residing within the plug;
$\Delta = CL_F - CL_A$, wherein
  $CL_A$=centerline of the width of the plug; and
  $CL_F$=centerline of the ferrule residing within the plug.
$X_1$=the distance from the center of the opening in the tub 102 to the center of the key 104 for each mutually exclusive position.
$X_2$=the distance from the center of the plug 101 to the center of the slot 103 for each mutually exclusive position;

$X_{1a}$ = the $X_1$ distance for a sequentially first key in a series of connectors;

$X_{1b}$ = the $X_1$ distance for a sequentially second key in a series of connectors;

W = the wall thickness of the plug housing

Z = the minimum distance required to ensure that the flat portion of the key does not contact the flat portion of the plug 107 when a user attempts to mate a mating pair;

$Clear_1$ = the clearance distance between the center side of the key and the center side of the slot;

These relationships must be satisfied for the mating pairs to mate and for the non-mating pairs to definitely not mate. Specifically, for a mating pair, Relationship (1) requires that half the ferrule width must be no less than $X_1$ less one half of C added to the difference between the width of the tub opening D less the width of the plug added to the difference between the centerline of the ferrule within the plug and the centerline of the plug. This ensures that the key is not positioned outside of the area on which at least a portion of the ferrule will reside. By adhering to this parameters the key will have some overlap with the ferrule, and thus will provide for pre-alignment of the ferrule in the same manner as do the ribs on the three sides of the ferrule without the key.

Relationship (2) requires that $X_2$ added to one-half of dimension B is less than one-half of dimension A less W. This assures that the slot resides on the plug within the confines of the plug walls.

Finally, according to Relationship (3), for each mutually exclusive position, the distance $X_1$ for the first connector in the system ($X_{1a}$) added to $Clear_1$ added to a predefined interference interval Z would correspond to the distance $X_1$ for the next slot/key position ($X_{1b}$) Z is the minimum distance required to ensure that the flat portion of the key does not contact the flat portion of the plug 107 when a user attempts to mate the two portions of a connecter which is intended to mate.

By way of example, four mutually exclusive locations for locating the slot on the plug housing and the key on the tub are defined below for an MT-RJ connector. The MT-RJ connector has the following dimensions:

A = 7.15±0.05 mm

B = 1.25 mm

C = 0.95±0.04 mm

D = 7.24±0.04 mm

F = 4.5±0.04 mm $Clear_1$ = 0.15 mm

W = 0.8 mm

Based on these MT-RJ dimensions, it has been found that the following $X_1$ key positions satisfy the relationships above:

| Mating pair | Key Position | $X_1$ |
| --- | --- | --- |
| 1 | 1 | 0.8 mm |
| 2 | 2 | 1.6 mm |
| 3 | 3 | −0.8 mm |
| 4 | 4 | −1.6 mm |

Although the data above indicates four mutually exclusive positions, it should be understood that additional positions are possible within the parameters of the MT-RJ connector. Additionally, it should be understood that the combinations of various key positions can be used to increase the number of permutations of mating pairs. For example, in addition to the four mating pairs listed above, additional mating pair configurations may obtained from the following combinations of key positions:

| Mating pair | Key Positions |
| --- | --- |
| 5 | 1, 2 |
| 6 | 1, 2, 3 |
| 7 | 1, 2, 3, 4 |
| 8 | 2, 3 |
| 9 | 2, 4 |
| 10 | 2, 3, 4 |
| 11 | 3, 4 |
| 12 | 1, 3 |
| 13 | 1, 4 |
| 14 | 1, 3, 4 |
| 15 | 1, 2, 4 |

Figure 6A:
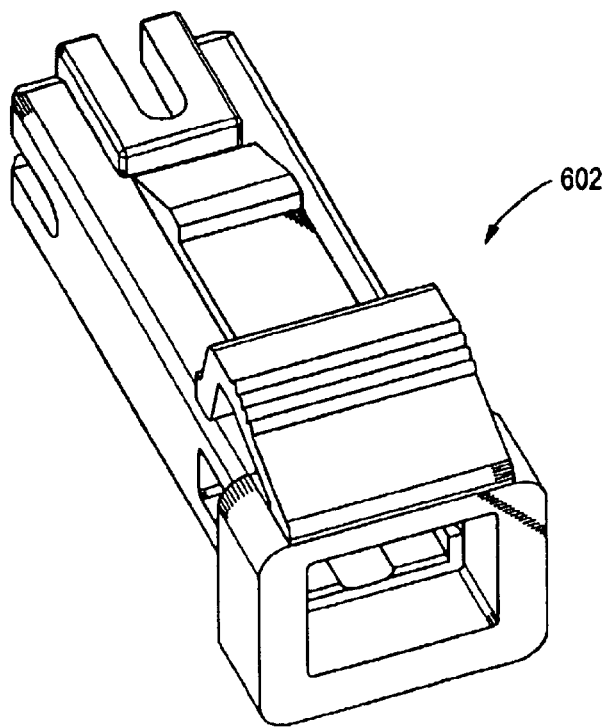
FIG. 6 and FIG. 7 shows the slot and key features as combined with an MT-RJ connector manufactured by Tyco Electronics (Harrisburg, Pa.).
Figure 6B:
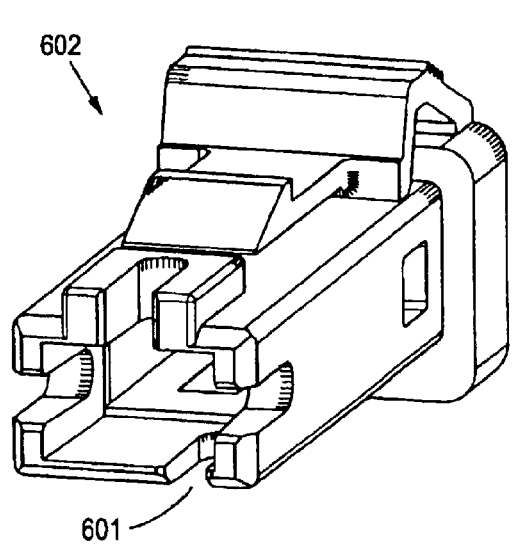
Figure 6C:
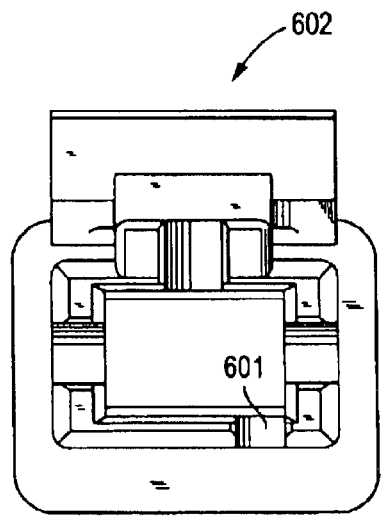

In a preferred embodiment, the key and slot components are combined with the industry standard MT-RJ connector. FIG. 6 and FIG. 7 show the key-slot combination added to the MT-RJ connector as produced by Tyco Electronics of Harrisburg, Pa.

Figure 7A:
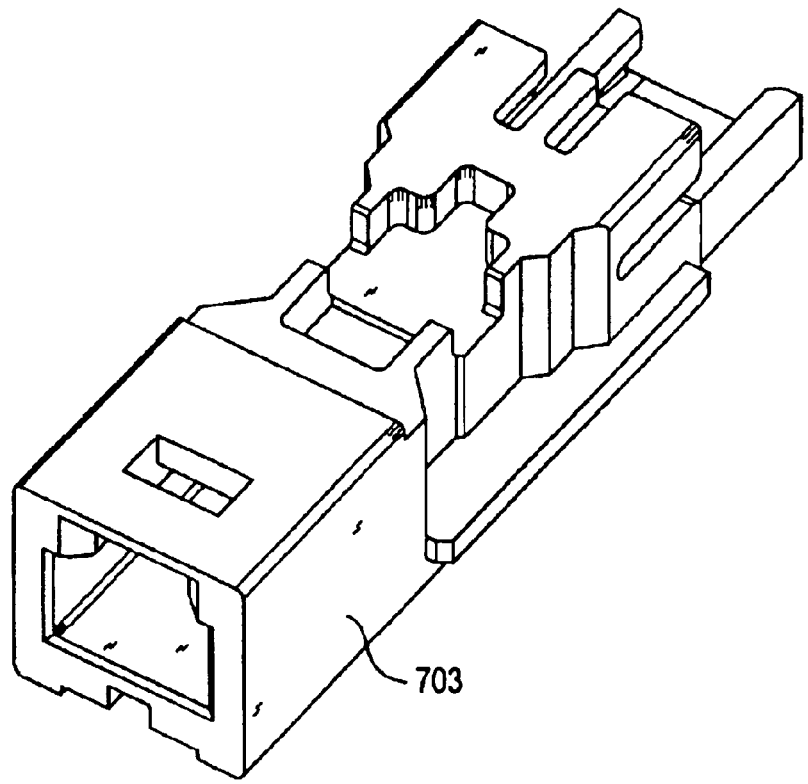
Figure 7B:
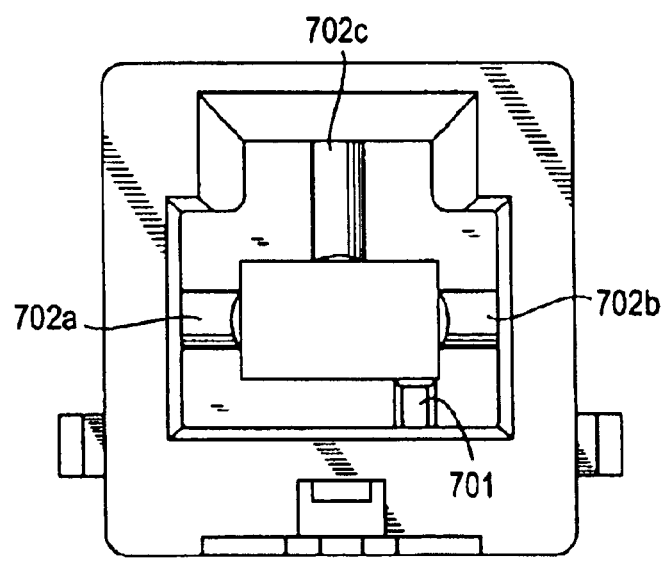

FIGS. 6 (a)–(c) show the plug 602 of the MT-RJ connector combined with the slot 601 of the present invention. FIGS. 7(a) and 7(b) show the center tub portion 703 of an MT-RJ connector jack. The key is shown as 701 located in one of the plurality of possible positions. The three pre-alignment ribs are shown as 702a, 702b, and 702c. The key 701 functions as the discriminating member for allowing or preventing mating with a plurality of plugs, while at the same time functioning as the pre-alignment member for the remaining side of the ferrule not aligned with ribs 702a, 702b, and 702c.

To provide a simple and readily apparent indication to the user of which plugs mate with which receptacles, it is preferable to mark mating pairs with indicia or color to indicate their compatibility. In a preferred embodiment, the components of a mating pair are a similar color different from all others used in the connector system.

The system described allows for a series of mutually-exclusive connectors to be used in a manner which provides physical security to a network system. In light of the often highly sensitive data stored on many of the networks in use today, this is a highly desirable feature. The present invention is an effective way to segregate separate networks and assure that the proper users are connecting to the desired network. Additionally, the present invention may be employed in the manufacture of devices in which fibers or wires need to be connected in particular arrangements. More specifically, the discriminating connectors of the present invention can be engineered into a system such that, during manufacturing, the correct connection of the fibers/wires is ensured by the mating pairs and their ability to prevent all other "incorrect" connections. Applications requiring particular routing of fibers or wires include, for example, routers, backplane assemblies, and even component devices such as multiplexers/demultiplexers.

It should be understood that the foregoing is illustrative and not limiting and that obvious modifications may be made by those skilled in the art without departing from the spirit of the invention. Accordingly, the specification is intended to cover such alternatives, modifications, and equivalence as may be included within the spirit and scope of the invention as defined in the following claims.

What is claimed is:

1. A connector system for providing discriminating mating among optical fiber plugs and receptacles, said system comprising;

a plurality of receptacles, each receptacle comprising a jack having a tub having an inner surface with a first geometry, said first geometry comprising at least a key, each tub also comprising a plurality of ribs extending inward, at least two or more receptacles having different first geometries; and a plurality of optical fiber plugs, each optical fiber plug comprising a housing having a second geometry and a ferrule contained within the housing, said second geometry comprising a slot to receive a key of one of said plurality of receptacle, said housing also comprising secondary slots to receive said ribs of said each receptacle, at least two or more optical fiber plugs having different second geometries;

wherein a particular optical fiber plug of said plurality of optical fiber plugs having a particular second geometry and a particular receptacle of said plurality of receptacles having a particular first geometry mate such that the key and ribs of said particular receptacle are received by the slot and the secondary slots of said particular optical fiber plug to effect pre-alignment of the ferrule of said particular optical fiber plug, and wherein said particular second geometry physically interfering with all other first geometries to prevent said particular optical fiber plug from mating with one or more of said plurality of receptacles having said other first geometries.

2. The connector system as set forth in claim 1, wherein said receptacles and said optical fiber plugs have a front and back orientation, each housing having a housing centerline, a housing wall thickness, and a forward face having a flat portion, each ferrule having a center line and a portion to be received within an opening of said tub, said portion having a ferrule width, said key having a forward face having a flat portion, a key width, a key center, wherein the position of the slot, complies with the following formula:

$$X_1 - C/2 + (D-A) + \Delta \leq F/2$$

wherein:
A=optical fiber plug width;
C=key width;
D=distance across the opening of the tub;
F=ferrule width;
$\Delta = CL_F - CL_A$, wherein
  $CL_A$=housing centerline; and
  $CL_F$=ferrule centerline;
$X_1$=distance from the center of the opening in the tub to the key center wherein the position of the key complies with the following formula:

$$X_2 + B/2 < A/2 - W$$

wherein:
$X_2$=the distance from the centerline to the slot center
W=housing wall thickness;
B=slot width; and
wherein slot and key positions of non-mating optical fiber plugs and receptacles comply with the following formula:

$$X_{1a} + \text{Clear}_1 + Z = X_{1b}$$

wherein,
$X_{1a}$=$X_1$ distance for a first key in a first position of a first optical fiber plug of said plurality of optical fiber plugs;
$X_{1b}$=$X_1$ distance for a second key in a second position of a second optical fiber plug of said plurality of optical fiber plugs;

Z=predetermined distance required to ensure that said flat portion of the key will not contact said flat portion of the optical fiber plug; and
$\text{Clear}_1$=the clearance distance between the housing centerline side of the key and the housing centerline side of the slot.

3. The connector system as set forth in claim 1 wherein the said optical fiber plugs are push-pull connectors.

4. The connector system as set forth in claim 1 wherein the said optical fiber plugs are MT type connectors.

5. The connector system as set forth in claim 4 wherein the said optical fiber plugs are MT-RJ connectors.

6. The system as set forth in claim 1, wherein all of said plugs and receptacles are marked for visual identification, plugs and receptacles which have cooperating first and second geometries have the same visual identification mark which is different from the visual identification mark on all other said plugs and receptacles, said visual identification mark including at least one of a color, alphanumerical, or symbol.

7. A connector system for providing discriminating mating among a family of optical fiber plugs and receptacles, said system comprising:

at least first and second optical fiber plugs and first and second receptacles, each optical fiber plug comprising a housing and a ferrule disposed in said housing, said housing of each optical fiber plug defining a slot and two or more secondary slots, the slot of said first optical fiber plug being a first slot in a first position, the slot of said second optical fiber plug being a second slot in a second position, said first and second positions being different, said first and second optical fiber plugs being physically the same except for the position of their respective slot, each receptacle comprising a tub defining a cavity, said tub having a key and two or more ribs extending inwardly from said tub into said cavity, the key of said first receptacle being a first key in a first position, the key of said second receptacle being a second key in a second position, said first and second positions being different, said first and second receptacles being physically the same except for the position of their respective key;

wherein said first optical fiber plug is configured to mate with said first receptacle, said first slot adapted to receive said first key and the secondary slots of said first optical fiber plug adapted to receive the ribs of said first receptacle to allow said first optical fiber plug to mate with said first receptacle, said first key and the ribs of said first receptacle serving to prealign the ferrule of said first optical plug during mating, said second key interfering with said first optical fiber plug to prevent said first optical fiber plug from mating with said second receptacle; and wherein said second optical fiber plug is configured to mate with said second receptacle, said second slot being adapted to receive said second key and the secondary slots of said second optical fiber plug adapted to receive the ribs of said second receptacle to allow said second optical fiber plug to mate with said second receptacle, said second key and the ribs of said second receptacle serving to prealign the ferrule of said second optical plug during mating, said first key interfering with said second optical fiber plug to prevent said second optical fiber plug from mating with said first receptacle.

8. The connector system of claim 7, wherein said first and second optical fiber plugs are different colors.

9. The connector system of claim 7, wherein said first and second optical fiber plugs are push-pull connectors.

10. The connector system of claim 7, wherein said first and second optical fiber plugs are MT type connectors.

11. The connector system of claim 10, said first and second optical fiber plugs are MT-RJ connectors.

12. A connector system for providing discriminating mating among a family of optical fiber plugs and receptacles, said system comprising:

at least a first MT-RJ plug and a second MT-RJ plug, said first MT-RJ plug comprising a first housing containing a first ferrule, said first housing defining a first slot in a first position, said second MT-RJ plug comprising a second housing containing a second ferrule, said second housing defining a second slot in a second position, said first and second MT-RJ plugs being physically the same except for the position of their respective slot, each MT-RJ plug comprising two or more secondary slots;

wherein said first MT-RJ plug is configured to mate with a first receptacle, said first receptacle comprising a tub defining a cavity for receiving said first MT-RJ plug, said tub having a first key and two or more ribs extending into said cavity, said first slot and the secondary slots adapted to receive said first key and the ribs of said first receptacle, respectively, to allow said first MT-RJ plug to mate with said first receptacle, said first key and said ribs of said first receptacle being immediately adjacent the ferrule of said first MT-RJ plug during mating, thereby aligning said ferrule relative to the tub of the first receptacle prior to mating, said second key interfering with said first MT-RJ plug to prevent said first MT-RJ plug from mating with said second receptacle; and wherein said second MT-RJ plug is configured to mate with said second receptacle, said second receptacle comprising a tub defining a cavity for receiving said second MT-RJ plug, said tub having a second key and two or more ribs extending into said cavity, said second slot and the secondary slots adapted to receive said second key and the ribs of said second receptacle, respectively, to allow said second MT-RJ plug to mate with said second receptacle, said second key and said ribs of said second receptacle being immediately adjacent the ferrule of said second MT-RJ plug during mating, thereby aligning said ferrule relative to the tub of the second receptacle prior to mating said first key interfering with said second MT-RJ plug to prevent said second MT-RJ plug from mating with said first receptacle.

13. The connector system of claim 12, further comprising a third MT-RJ plug having a universal slot in said first and second positions, said universal slot being adapted to receive said first and second keys to allow said third MT-RJ plug to mate with said first and second receptacles.

14. The connector system of claim 12, further comprising said first and second receptacles.

* * * * *